US006866769B2

(12) United States Patent
Anderson et al.

(10) Patent No.: US 6,866,769 B2
(45) Date of Patent: Mar. 15, 2005

(54) DRIVE HEAD AND ECM METHOD AND TOOL FOR MAKING SAME

(75) Inventors: William C. Anderson, Springdale, OH (US); Edward I. Stamm, Cincinnati, OH (US); Vicky S. Budinger, Loveland, OH (US); Terry L. Lievestro, West Chester, OH (US)

(73) Assignee: General Electric Company, Schenectady, NY (US)

( * ) Notice: Subject to any disclaimer, the term of this patent is extended or adjusted under 35 U.S.C. 154(b) by 190 days.

(21) Appl. No.: 10/288,921

(22) Filed: Nov. 6, 2002

(65) Prior Publication Data

US 2003/0089621 A1 May 15, 2003

Related U.S. Application Data

(60) Provisional application No. 60/332,944, filed on Nov. 14, 2001.

(51) Int. Cl.$^7$ .............................. C25F 3/00; C25F 7/00; B23H 3/00; B23H 3/10
(52) U.S. Cl. ...................... 205/640; 205/652; 205/654; 205/672; 205/674; 205/685; 204/224 M
(58) Field of Search ................................ 205/640, 652, 205/654, 672, 674, 685, 686; 204/224 M, 640

(56) References Cited

U.S. PATENT DOCUMENTS

| | | | |
|---|---|---|---|
| 3,058,895 A | 10/1962 | Williams | |
| 3,060,114 A | 10/1962 | Sanders | 204/225 |
| 3,095,364 A | 6/1963 | Faust et al. | 204/143 |
| 3,156,808 A | 11/1964 | Davies et al. | 219/69 |
| 3,352,190 A | 11/1967 | Carlson | 85/9 |
| 3,354,757 A | 11/1967 | Grimm et al. | 81/90 |
| 3,393,141 A * | 7/1968 | Trenn et al. | 204/224 M |
| 3,492,903 A | 2/1970 | Thurston | 85/47 |
| 3,499,830 A * | 3/1970 | Haggerty et al. | 204/224 M |
| 3,615,906 A * | 10/1971 | Vanwanderham et al. | 148/677 |
| 3,714,017 A | 1/1973 | Stark et al. | 204/284 |
| 3,723,268 A | 3/1973 | Johns et al. | 204/129.1 |
| 3,730,861 A | 5/1973 | Haggerty | 204/129.75 |
| 3,769,194 A | 10/1973 | Haggerty | 204/224 |
| RE28,564 E | 9/1975 | Inoue | 204/129.2 |
| 3,969,974 A | 7/1976 | Lejdegard | 85/45 |
| 3,970,538 A | 7/1976 | Lucas | 204/224 |
| 4,023,225 A | 5/1977 | Tochilkin et al. | 10/27 R |
| 4,153,524 A | 5/1979 | Roche et al. | 204/129.43 |
| 4,160,710 A | 7/1979 | Greenwood | 204/129.25 |
| 4,217,190 A | 8/1980 | Neal et al. | 204/129.35 |
| 4,250,011 A | 2/1981 | Capello et al. | 204/224 M |
| 4,256,555 A | 3/1981 | Wilson et al. | 204/129.5 |
| 4,257,865 A | 3/1981 | Semashko et al. | 204/224 M |
| 4,264,417 A | 4/1981 | Vasiliev et al. | 204/129.43 |
| 4,417,464 A | 11/1983 | Tosa | 72/478 |
| RE31,605 E | 6/1984 | Neal et al. | 204/129.35 |
| 4,468,304 A | 8/1984 | Hill | 204/129.6 |
| 4,473,738 A | 9/1984 | Wolfe et al. | 219/152 |
| 4,504,721 A | 3/1985 | Inoue | 219/69 M |
| 4,522,692 A | 6/1985 | Joslin | 204/129.5 |
| 4,601,623 A * | 7/1986 | Wallace | 411/336 |

(List continued on next page.)

*Primary Examiner*—Donald R. Valentine
(74) *Attorney, Agent, or Firm*—Eric W. Guttag; Jagtiani + Guttag

(57) ABSTRACT

A drive head for a bolt, fastener, coupling, nut or other driveable head made from a less malleable metal such as a powder metal nickel alloy. The drive head has an upper drive portion having at least six convex corners spaced around the outer periphery thereof, each corner terminating in an edge. The drive head also has a lower flange portion adjacent to the drive portion and having an edge extending radially outwardly to at least the edge of each corner. The drive portion and the flange portion of the drive head is formed by subjecting a blank having a generally circular head to electrochemical machining (ECM). A tool is also provided for the ECM method to form the drive portion and flange portion of the drive head.

20 Claims, 4 Drawing Sheets

U.S. PATENT DOCUMENTS

| | | | |
|---|---|---|---|
| 4,657,645 A | 4/1987 | Hinman | 204/129.1 |
| 4,657,649 A | 4/1987 | Hinman | 204/224 M |
| 4,663,011 A | 5/1987 | Hinman | 204/224 M |
| 4,684,455 A | 8/1987 | Hinman | 204/212 |
| 4,686,020 A | 8/1987 | Hinman | 204/129.1 |
| 4,752,366 A | 6/1988 | Hinman | 204/224 M |
| 4,772,368 A | 9/1988 | Rabian | 204/129.43 |
| 4,772,372 A | 9/1988 | Bruns et al. | 204/224 M |
| 4,957,567 A | 9/1990 | Krueger et al. | 148/12.7 |
| 4,997,534 A | 3/1991 | Thornton | 204/129.1 |
| 5,062,931 A | 11/1991 | Kephart | 204/129.7 |
| 5,320,467 A * | 6/1994 | Erbes | 411/386 |
| 6,017,274 A | 1/2000 | Sherman et al. | 470/16 |

* cited by examiner

US 6,866,769 B2

DRIVE HEAD AND ECM METHOD AND TOOL FOR MAKING SAME

CROSS-REFERENCE TO RELATED APPLICATION

This application claims the benefit of co-pending U.S. Provisional Patent Application Ser. No. 60/332,944 filed Nov. 14, 2001.

BACKGROUND OF THE INVENTION

The present invention relates generally to a drive head, such as for a bolt, coupling, nut or the like, particularly those made from metals that are less malleable at forging temperatures and thus require special methods in making to prevent cracking. The present invention further relates to an electrochemical machining method, as well as a tool, useful in making such a drive head.

Fasteners such as bolts or nuts are typically provided with a drive head that can be gripped by the tool, e.g., wrench, so that sufficient torque can be generated to twist or rotate the fastener. The external surface of the drive head can have a number of different configurations. Some typical configurations include square heads (i.e., having four points or corners) and hexagonal heads (i.e., having six points or corners). See, for example, U.S. Pat. No. 3,492,908 (Thurston), issued Feb. 3, 1970, which shows a bolt having a hexagonal head. Other configurations include those having as many as twelve points or corners (sometimes referred to as a "double hexagonal" configuration) to provide the ability to increase the amount of torque that can be imparted by the wrench. See U.S. Pat. No. 3,352,190 (Carlson), issued Nov. 14, 1967; and U.S. Pat. No. 3,354,757 (Grimm et al), issued Nov. 28, 1967. For fasteners such as bolts, the drive head is typically connected to an externally threaded shank. (For fasteners such as nuts, the drive head typically has an internally threaded interior bore and no shank.)

The difficulty in fabricating drive heads for bolts becomes greater as the number of points or corners increases in number. This is particularly the case for bolts where the drive head has a double hexagonal configuration. Relative to a hexagonal configuration, the double hexagonal configuration has a much smaller radius from point to point. This makes it more difficult to provide a double hexagonal configuration in drive head having points or corners that are sufficiently well-defined and sharp so that the wrenching tool can engage the drive head without stripping the points or corners over time.

The difficulty in fabricating drive heads for bolts can also be affected by the ductility (malleability) of the metal, especially at the forging temperature used to make the bolt. Forging temperatures are chosen to be high enough to reduce the energy required for deformation and to reduce the propensity of the metal to crack, but low enough to preclude undesirable metallurgical changes in the metal. For metals having relatively high ductility over a large range of forging temperatures (i.e., are more malleable), the drive head can typically be formed by extrusion, forging or cold forming techniques. These fabrication methods basically form the desired configuration for the drive head by either directly deforming the metal, or by heating the metal either directly (or indirectly due to friction) and then deforming the metal. See, for example, U.S. Pat. No. 3,352,190 (Carlson), issued Nov. 14, 1967. See also U.S. Pat. No. 4,417,464 (Tosa), issued Nov. 29, 1983 (nib tool for cold head forming of a bolt having a hexagonal head); and U.S. Pat. No. 4,023,225 (Tochilkin et al), issued May 17, 1977 (cold shaping of bolt having a hexagonal head). However, for bolts made from metals that need to be forged in a very narrow temperature range, such as powder metal alloys (e.g., nickel alloys containing significant levels of nickel (e.g., at least about 40%) and other metals such as cobalt and chromium), conventional deforming techniques typically used to make bolts have not been found to be suitable. Conventional bolt forging in particular has been found to have a propensity to crack bolts made from less malleable metals, especially when a double hexagonal configuration is formed in the drive head of the bolt.

Other methods that have been used to form drive heads on bolts are electrical (electrode) heating techniques, such as by electrical discharge machining (EDM). See, for example, U.S. Pat. No. 4,473,738 (Wolfe et al), issued Sep. 25, 1984, which discloses an apparatus for forming a polygonal head on the end of a tie rod using a pair of reciprocating electrodes that define a die cavity having walls forming the desired polygonal contour (e.g., hexagonal). Electrical (electrode) heating techniques either etch the surface by moving the electrode so as to melt off material to form the desired drive head configuration, or by generating enough heat from the electrode to melt and deform the drive head within a die having the desired configuration. However, electrical (electrode) heating techniques such as EDM having been found to be unsuitable for forming drive heads from bolts made from less malleable metals, especially those having a double hexagonal configuration. In particular, EDM has been found to undesirably create a large recast layer on the shaped drive head, and can result in reduced material strength and fatigue life for the bolt.

Fabricating drive heads in bolts can be further complicated if it is desired to have an integral flange in the bolt adjacent to the drive head to provide an integral washer or to provide a washer-engaging face. See U.S. Pat. No. 3,492,908 (Thurston), issued Feb. 3, 1970, where bolt 7 has a cylindrical flange 12 adjacent to drive head 11. See also U.S. Pat. No. 3,352,190 (Carlson), issued Nov. 14, 1967, where fastener 10 has a thin integral washer 30 adjacent to drive head 12. This problem of providing such a flange is exacerbated in forming drive heads in bolts made from lower ductility materials, especially if the drive head is to have a double hexagonal configuration where the points or corners need to be well-defined and sharp.

Accordingly, it would be desirable to provide a bolt, nut or other driveable article made from a less malleable metal that has well-defined and sharp points or corners, even when the drive head has a double hexagonal configuration, and having a flange adjacent to the drive head. It would also be desirable to provide a method for making such a bolt that does not have propensity to crack the bolt, to create a recast layer, to reduce material strength or fatigue life, or to impart other undesired properties.

SUMMARY OF THE INVENTION

The present invention relates to a drive head for a bolt, nut, coupling, or other driveable article made from a less malleable metal or metal alloy such as powder metal nickel alloys comprising at least about 40% nickel. The drive head comprises:

(a) an upper drive portion having at least six convex corners spaced around the outer periphery thereof, each corner terminating in an edge; and (b) a lower flange portion adjacent to the drive portion and having an edge extending radially outwardly to at least the edge of each corner;

(c) the drive portion and flange portion being formed by electrochemical machining.

The present invention also relates to a method for forming the corners in the drive portion of the drive head, as well as the flange portion. This method comprises the steps of:

(a) providing a blank made from a metal or metal alloy and having a generally circular head; and (b) subjecting the head to electrochemical machining to form the drive portion and the flange portion of the drive head.

The present invention further relates to a tool useful in this electrochemical machining method for forming the corners in the drive portion of the drive head, as well as the flange portion. This tool comprises:

(1) a shaping end having a cutting face;

(2) a chamber for the passage of electrolyte fluid that opens at the cutting face;

(3) the cutting face having an inner portion adjacent to the chamber, the inner portion of the cutting face having at least six circumferentially spaced concave recesses; and (4) each recess having a concave relief.

The drive portion of the drive head of the present invention can be provided with sharp and well-defined edges at each corner to allow the drive tool (e.g., wrench) to grip the drive portion and easily supply sufficient torque to twist or rotate the drive head. This can be achieved by using the electrochemical machining method and tool of the present invention, even when the drive portion of the drive head has a double hexagonal configuration (i.e., twelve corners), as well as a flange portion adjacent to the drive portion. In particular, the electrochemical machining method and tool of the present invention avoids problems (e.g., cracking, creating recast layers and reducing material strength or fatigue life) of prior forging and electrical discharge machining (EDM) methods in forming the drive head of the present invention from less malleable, harder metals or metal alloys, such as powder metal nickel alloys comprising at least about 40% nickel.

DETAILED DESCRIPTION OF THE INVENTION

As used herein, the term "driveable article" refers to those articles that have a drive head and are generally twisted or rotated about a longitudinal axis by a tool (e.g., wrench) or other drive component. Driveable articles include fasteners such as bolts, or nuts, couplings such as curvic couplings, splines, gears, etc.

As used herein, the term "less malleable metal" refers to those metals that are difficult or impossible to shape or form by conventional bolt forging techniques. These harder, less malleable metals and metal alloys include powder metal nickel alloys comprising at least about 40% nickel (e.g., from about 40 to about 75%), more typically at least about 45% nickel (e.g., from about 45 to about 60%). These powder metal nickel alloys can also comprise at least about 5% cobalt (e.g., from about 5 to about 21%), more typically at least about 12% cobalt (e.g., from about 12 to about 14%) and at least about 10% chromium (e.g., from about 10 to about 22%), more typically at least about 15% chromium (e.g., from about 15 to about 17%). See U.S. Pat. No. 4,957,567 (Krueger et al), issued Sep. 18, 1990 (herein incorporated by reference) which discloses representative powder nickel alloys suitable for use in the present invention. These powder nickel alloys can also include other metals such as molybdenum (e.g., from about 3.5 to about 4.5%), tungsten (e.g., from about 3.5 to about 4.5%), aluminum (e.g., from about 1.5 to about 2.5%), titanium (e.g., from about 3.2 to about 4.2%), niobium (e.g., from about 0.5 to about 1%), zirconium (e.g., from about 0.01 to about 0.06%), vanadium (e.g., up to about 0.01%), hafnium (e.g., up to about 0.3%) and yttrium (e.g., up to about 0.01%).

Figure 1:
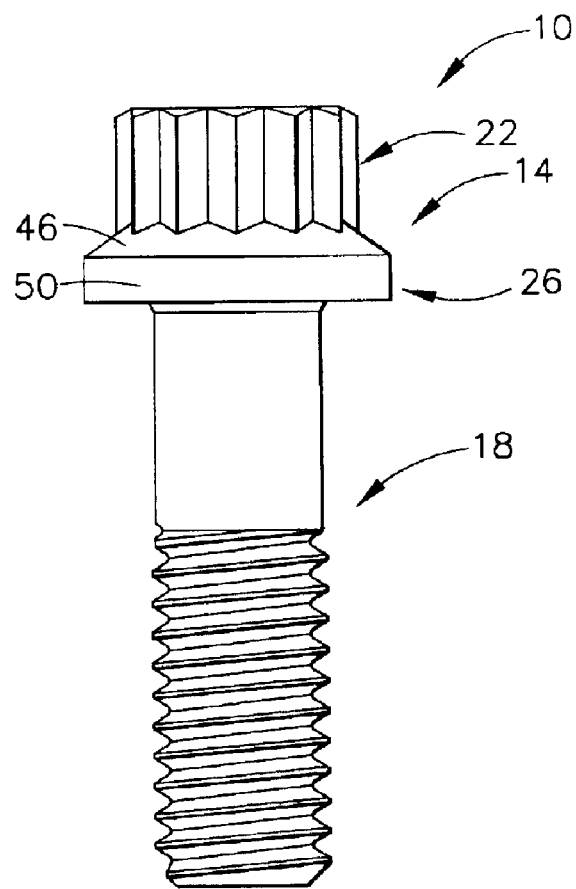
FIG. 1 is a side view of an embodiment of a bolt of the present invention.

Referring to the drawings, FIG. 1 shows an embodiment of the driveable article of the present invention in the form of a bolt generally indicated as 10. In addition to bolts, driveable articles of the present invention can be in the form of a nut, coupling, spline, gear, etc. However, for purpose of illustrating the present invention, the description hereafter will be with reference to a bolt.

Figure 2:
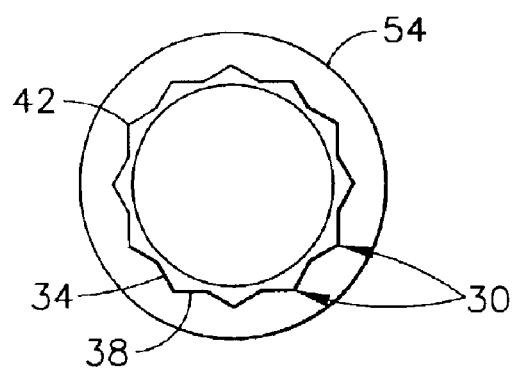
FIG. 2 is a top plan view of the bolt of FIG. 1.

As shown in FIGS. 1 and 2, bolt 10 comprises an upper drive head indicated generally as 14 and lower generally cylindrical shank generally indicated as 18. Shank 18 typically has a threaded exterior surface for securing it to a fastener such as a nut. Drive head 14 comprises an upper drive portion indicated generally as 22 and a lower flange portion adjacent to one end of shank 18. As shown particularly in FIG. 2, drive portion 22 has a plurality of generally V-shaped convex corners 30 spaced around the outer periphery thereof. (In the case of a spline configuration, such as a spline gear, corners 30 would be squared-off instead of generally V-shaped.) As shown in FIG. 2, drive portion 22 has twelve such corners, i.e., is a double hexagonal configuration. However, the bolt of the present invention can have at least six such corners, for example, six (i.e., hexagonal configuration), eight, ten or twelve corners, and typically has at least twelve corners. Each corner 30 has a first face 34 and second face 38. The intersection of faces 34 and 38 forms an outer edge 42 for each corner 30. Edge 42 is typically well-defined and sharp so that it is easily gripped by the drive component (e.g., wrench).

As shown in FIG. 2, flange portion 26 can comprise an upper generally sloping section indicated as 46 and a lower generally circular section indicated as 50 adjacent to shank 18. Sections 46 and 50 intersect at generally circular edge 54. As shown in FIG. 1 and particularly FIG. 2, edge 54 extends radially outwardly to at least edges 42 of each corner 30 and typically extends outwardly beyond edges 42.

Figure 3:
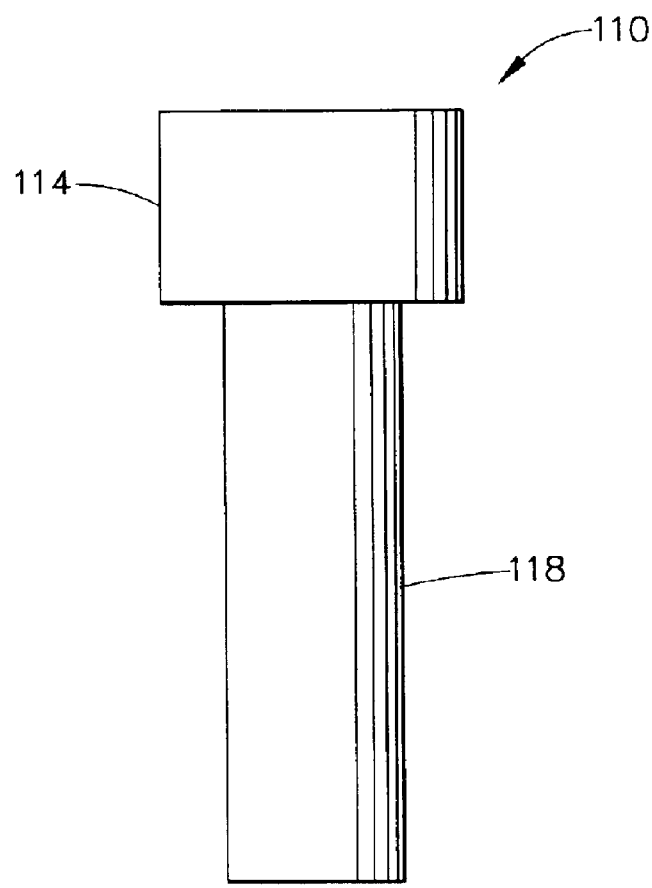
FIG. 3 is a side view of an embodiment of a blank used in making the bolt of the present invention.
Figure 4:
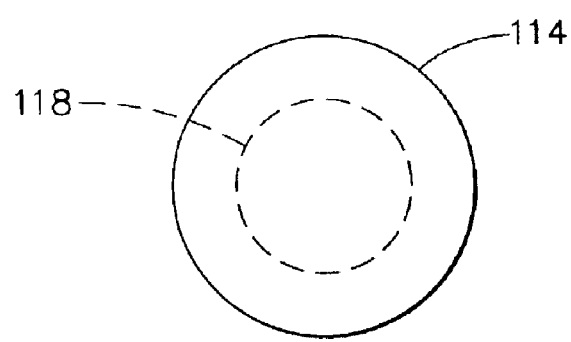
FIG. 4 is a top plan view of the blank of FIG. 3.

FIGS. 3 and 4 show an embodiment of a blank generally indicated as 110 that can be used to form bolt 10. Blank 110 has a generally circular head 114 from which drive head 14 is formed. Blank 110 also has a cylindrical shaft 118 connected to head 114 from which shank 18 is formed.

Blank 110 and bolt 10 that is made from it can be made from a variety of metals or metal alloys including those comprising iron, nickel, cobalt, chromium, molybdenum, tungsten, aluminum, titanium, niobium, zirconium, vanadium, hafnium, and yttrium. Of particular interest to the present invention are blanks 110 and bolts 10 made from harder, less malleable metals (and metal alloys) that are difficult to manipulate with conventional bolt forging techniques. These harder, less malleable include powder nickel alloys as previously defined.

Figure 5:
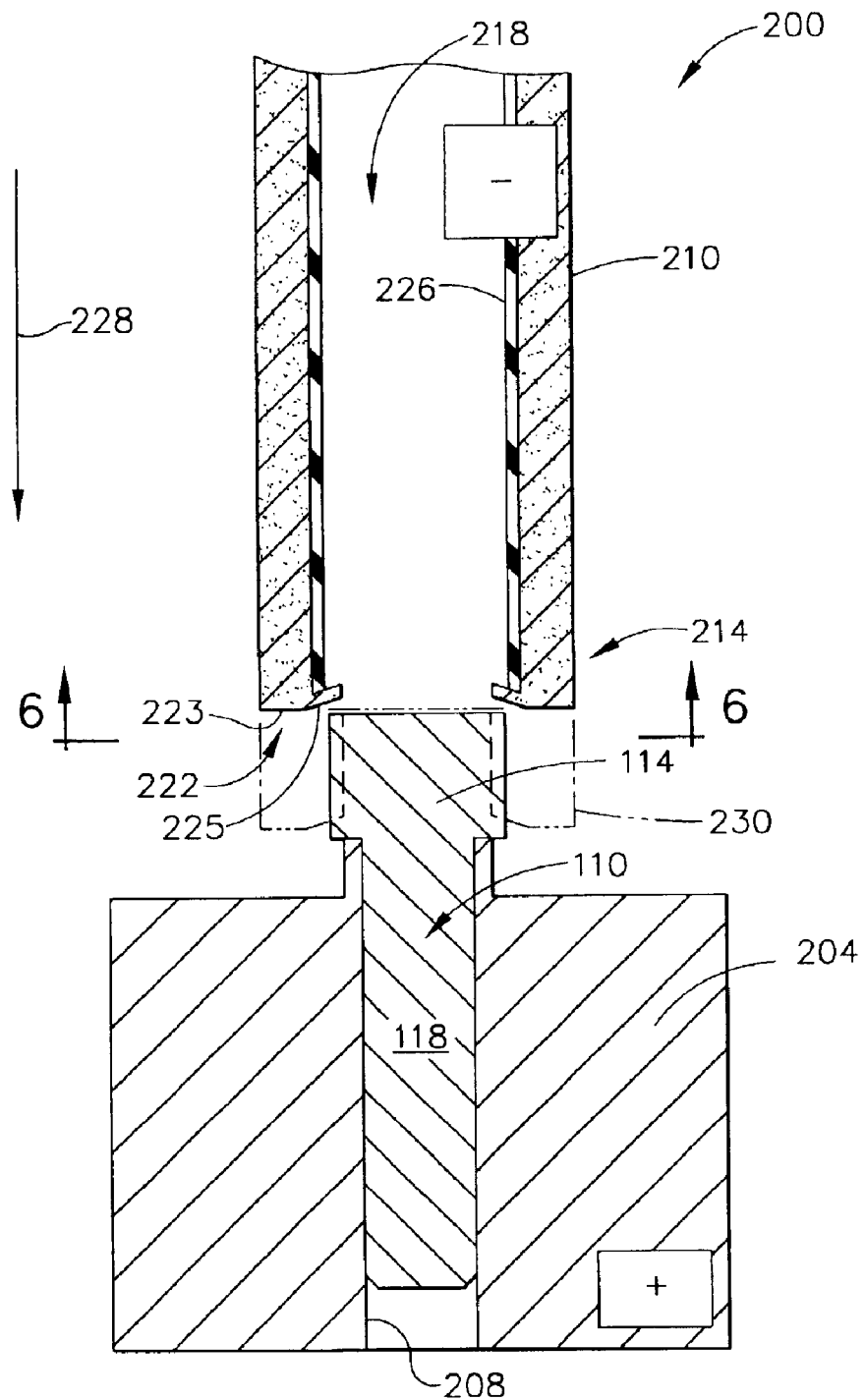
FIG. 5 is a side sectional view of an embodiment of the electrochemical machining (ECM) apparatus that is shown forming the drive head for the bolt of the present invention.

FIG. 5 shows an embodiment of an electrochemical machining (ECM) apparatus indicated generally as 200 that is shown forming the drive head 14 of bolt 10 from head 114 of blank 110. As shown in FIG. 5, apparatus 200 includes a block or holder 204 having cylindrical bore 208 for receiving and securing shaft 118 of blank 110, with head 114 of blank 110 extending above holder 204. Apparatus 200 also includes a shaping tool indicated generally as 210 that has a shaping end 214 and a generally cylindrical bore or chamber indicated as 218 (for the passage of electrolyte fluid) that extends longitudinally through 210 tool and opens at a cutting face indicated as 222 of shaping end 214. Cutting face 222 has an outer annular relatively planar portion indicated as 223 and an inner sloped or tapered portion indicated as 225 that is adjacent to chamber 218 where it opens at cutting face 222. As shown in FIG. 5, chamber 218 is provided with insulation 226 that extends from just behind or above cutting face 222 along the length of chamber 218.

In carrying out the ECM method of the present invention using apparatus 200, a direct electrical current (DC) is applied between blank 110 (as the work piece) which is positively charged (i.e., is the anode) and tool 210 which is negatively charged (i.e., is the cathode). An electrolyte fluid is used to conduct the current across the gap between tool 210 (the cathode) and blank 110 (the anode). Suitable electrolyte fluids include aqueous electrolyte fluids where an electrolyte salt, such as sodium chloride, sodium bromide, sodium iodide, sodium chlorate, sodium perchlorate, sodium sulfate, sodium nitrate, and mixtures thereof, is dissolved in water, typically in a concentration of from about 0.5 to about 3 lb./gallon (from about 60 to about 360 g./l). For example, a suitable electrolyte fluid can be prepared by dissolving about 1.1 lb. of sodium chloride per gallon of water (about 132 g./l.).

As shown in FIG. 5, tool 210 advances in the direction indicated by arrow 228 (the cutting direction) towards head 114 of blank 110. As the cutting face 222 of tool 210 is brought closer to head 114 of blank 110, the electrolyte is pumped from a source (not shown) at a controlled rate (for example, in the range of from about 100 to about 200 ft./sec. or from about 30.5 to about 61 m./sec.) into chamber 218 and then passes or flows out through the gap between cutting face 222 and head 114. An electrical potential (e.g., from about 12 to about 18 volts) is applied across the electrolyte with the current flowing from the head 114 of blank 110 (the anode) to cutting face 222 of tool 210 (the cathode). As a result of the current being applied across the electrolyte, the metal molecules of head 114 and water molecules from the electrolyte breakdown and form a metal hydroxide and hydrogen gas.

The rate of breakdown or dissolution is proportional to the rate of current flow (i.e., amperage), as shown by Ohm's law (I=VR), where I is the current, V is the voltage and R is the resistance. Accordingly, higher voltages (i.e., by increasing the current flow), while keeping the resistance constant, will increase the rate of breakdown or dissolution. (A similar effect can be achieved by lowering the resistance.) The smaller the gap maintained between cutting face 222 of tool 210 and head 114 of blank 110, the lower will be the resistance, thus leading to a higher rate of current flow; the higher the rate of current flow, the greater will be the rate of dissolution and removal of metal from head 114. Typically, the gap between planar portion 223 of the cutting face 222 and the top of head 114 (or the sloping section 46 of flange 26 as drive head 14 is formed) is in the range of from about 0.005 to about 0.015 in. (from about 0.1 to about 0.4 mm.) and is commonly referred to in the art as the "frontal" gap. Typically, the gap between inner portion 225 of cutting face 222 and faces 34/38 of each corner 30 of drive head 14 is in the range of from about 0.02 to about 0.05 in. (from about 0.5 to about 1.3 mm.) and is commonly referred to in the art as the "side" gap.

To keep the "frontal" and "side" gaps relatively small so as to maintain a maximum rate of metal removal, cutting face 222 of tool 210 is moved or advanced in the direction indicated by arrow 228 at a rate equivalent (or substantially equivalent) to the rate that metal is dissolved and removed from head 114 of blank 110. Typically the cutting face 222 is advanced in the direction indicated by arrow 228 at a rate in the range of from about 0.01 to about 0.4 in./min (from about 0.2 to about 10.2 mm./min.), and more typically in the range of from about 0.04 to about 0.2 in./min (from about 1 to about 5.1 mm./min.). The drive head 14 will begin to take shape since those areas closer to the cathode cutting face 222 dissolve quicker than areas further away from face 222. Tool 210 is also undercut and insulated in areas where the side of drive head 14 requires walls parallel to the centerline of bolt shank 18. In particular, insulation 226 attached or adhered to the surface of chamber 218 behind or above cutting face 222 minimizes current flow from the remainder of chamber 218 so that further metal dissolution or removal from those portions of drive head 14 that have been shaped by cutting face 222 is minimized.

Figure 6:
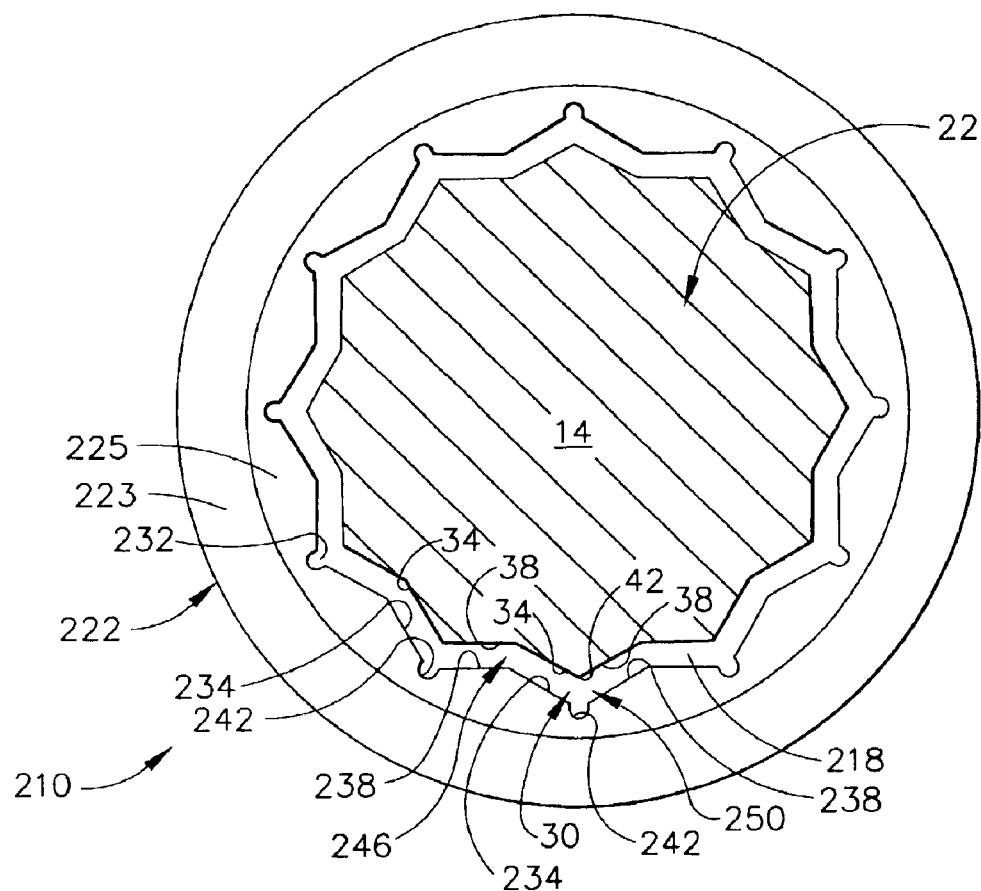
FIG. 6 is a complete view taken along line 6—6 of FIG. 5 that shows the drive head for the bolt of the present invention being formed from a blank.

As cutting face 222 moves concentrically along the exterior length of head 114 in the direction indicated by arrow 228 (i.e., towards shaft 118), and as metal is dissolved and removed from head 114, drive head 14 will take on the desired shape. After the cutting face 222 advances the distance indicated by outline 230 of the shaping end 214, the drive portion 22 and flange portion 26 will be formed in drive head 14. The particular distance cutting face 222 advances is determined by the design requirements for drive head 14. The particular shape of the drive portion 22 of drive head 14 will be determined by the shape or configuration of cutting face 222, and in particular the inner portion 225. For example, the shape or configuration for forming a twelve point bolt 10 (i.e., a twelve corner drive portion 22) is shown in FIG. 6. Referring to FIG. 6, cutting face 222 comprises a plurality of generally V-shaped concave recesses indicated generally as 232 that are formed in and circumferentially spaced around the inner portion 225 of cutting face 222 such that recesses 232 are also adjacent to chamber 218. As shown in FIG. 6, in order to form a twelve point bolt, there are twelve such recesses 232 formed in inner portion 225 of cutting face 222. As also shown in FIG. 6, each recess 232 is opposite to and is complementary of a respective corner 30 of drive head 14 that is formed by the inner portion 225 of cutting face 222. Each recess 232 has a first segment 234 and a second segment 238 that are opposite corresponding first and second faces 34 and 38 of the respective corner 30 that is formed.

A concave relief in the form of a generally semicircular groove or notch indicated as 242 is formed in each recess 232 and connects first and second segments 234 and 238. (Depending on the geometry of corner 30, relief 242 can be in the form of other concave shapes or configurations besides semicircular, so long as a laminar flow of the electrolyte is provided at corner 30.) Each relief 242 is opposite and is complementary to an edge 42 of the respective corner 30 of drive head 14. As shown in FIG. 6, there is a "side" gap indicated generally as 246 between the faces 34/38 of each complementary corner 30 and segments 234/238 of each recess 232. As also shown in FIG. 6, there is also a gap indicated generally as 250 between each complementary edge 42 of the respective corner 30 and the relief 242 of the respective recess 232.

In the absence of the relief 242, each corner 30 of drive portion 22 would not form a sharp edge 42 but would instead form a much more rounded edge. This is due to current flowing from head 114/drive head 14 across the electrolyte passing through "side" gap 246 to more than one of segments 234 and 238 of recess 232 of tool 210. By providing relief 242 in each recess 232, the current is less likely to flow to more than one of segments 234 and 238 (i.e., because of the increased width of gap 250), thus allowing for a relatively sharp edge 42 to be formed at each respective corner point 30. The size of relief 242 also needs to be relatively small. If relief 242 is too large, an undesired protrusion can form on each of the respective corners 30.

In the absence of relief 242, current will flow from corner 42 of the drive head 14 to both segments 238 and 234 of each recess 232 of tool 210, causing more material to be dissolved and removed from the corner 42 than from faces 34 and 38. This would result in a rounded corner 42, rather than a sharp, well-defined corner 42. Without a sharp, well-defined corner 42, it is usually significantly more difficult to apply proper torque to drive head 14 with a driveable tool (e.g., installation wrenches). The addition of semicircular relief 242 to each of the respective recesses 232 allows a sharp, more well defined corner 42 to be obtained by tool 210 during the ECM method for drive head 14, while still being able to generate section 46 of flange portion 26.

While specific embodiments of the method of the present invention have been described, it will be apparent to those skilled in the art that various modifications thereto can be made without departing from the spirit and scope of the present invention as defined in the appended claims.

What is claimed is:

1. A tool comprising:
   (1) a shaping end having a cutting face;
   (2) a chamber for the passage of electrolyte fluid that opens at the cutting face;
   (3) the cutting face having an inner portion adjacent to the chamber, the inner portion of the cutting face having at least six circumferentially spaced concave recesses; and
   (4) each recess being generally V-shaped and having a first and second segment, each recess further having a concave relief connecting the first and second segments.

2. The tool of claim 1 wherein the concave relief has a generally semicircular shape.

3. The tool of claim 1 wherein the inner portion of the cutting face has twelve circumferentially spaced recesses.

4. The tool of claim 3 wherein the inner portion of the cutting face is tapered.

5. A method for forming a drive head from a blank made of a metal or metal alloy, the method comprising the steps of:
   (a) providing a blank made from a metal or metal alloy and having a circular head; and
   (b) subjecting the circular head to electrochemical machining to form a drive head comprising an upper drive portion having a least twelve generally V-shaved convex corners spaced along the outer periphery thereof and a lower flange portion adjacent to the drive portion and having an edge extending radially outwardly to at least the edge of each corner.

6. The method of claim 5 wherein the metal or metal alloy is a powder metal nickel alloy comprising at least about 40% nickel, at least about 5% cobalt and at least about 10% chromium.

7. The method of claim 6 wherein the blank is a bolt blank that further comprises a cylindrical shaft connected to the head.

8. A method for forming a drive head in a bolt blank, the method comprising the steps of:
   (a) providing a bolt blank made from a powder metal nickel alloy comprising at least about 40% nickel, the bolt blank comprising a circular head and a cylindrical shaft;
   (b) providing a shaping tool comprising:
      (1) a shaping end with a cutting face;
      (2) a chamber for the passage of electrolyte fluid that opens at the culling face;
      (3) the cutting face having an inner portion adjacent to the chamber, the inner portion having at least six circumferentially spaced generally V-shaped concave recesses, each recess having a first segment and a second segment; and
      (4) a semicircular relief connecting the first and second segments; and
   (c) moving the cutting face concentrically along the exterior length of the circular head while applying an electrical current to the bolt blank and the shaping tool and passing an electrolyte fluid through the chamber to conduct current across the gap between the cutting face and the circular head until a drive head is formed in the circular head, the drive head that is formed comprising an upper drive portion having at least six generally V-shaped convex corners spaced along the outer periphery thereof, each corner terminating in an edge, and a lower flange portion adjacent to the drive portion and having an edge extending radially outwardly to at least the edge of each corner.

9. The method of claim 8 wherein an electrical potential of from about 12 to about 18 volts is applied across the electrolyte fluid.

10. The method of claim 9 wherein the electrolyte fluid comprises sodium chloride dissolved in the water.

11. The method of claim 10 wherein the cutting face is advanced along the exterior length of the head at a rate in the range of from about 0.01 to about 0.4 in./min (from about 0.2 to about 10.2 mm./min.).

12. The method of claim 11 wherein the rate of advance is in the range of from 0.04 to about 0.2 in./min (from about 1 to about 5.1 mm./min.).

13. The method of claim 11 wherein the inner portion of the cutting face has twelve circumferentially spaced recesses and wherein twelve corners are formed in the drive portion of the drive head.

14. A method for forming a drive head from a blank made of a metal or metal alloy, the method comprising the steps of:
   (1) providing a blank made from a metal or metal alloy and having a circular head; and
   (2) subjecting the circular head to electrochemical machining with a shaping tool to form a drive head comprising an upper drive portion having a least six generally V-shaped corners spaced along the outer periphery thereof and a lower flange portion adjacent to the drive portion and having an edge extending radially outwardly to at least the edge of each corner, wherein the shaping tool comprises:
(1) a shaping end with a cutting face;
(2) a chamber for the passage of electrolyte fluid that opens at the cutting face;
(3) the cutting face having an inner portion adjacent to the chamber, the inner portion of the cutting face having at least six circumferentially spaced generally V-shaped concave recesses, each recess having a first segment and a second segment; and
(4) a semicircular relief connecting the first and second segments.

15. The method of claim 14 wherein the inner portion of the cutting face has twelve circumferentially spaced recesses and wherein twelve corners are formed in the drive portion of the drive head.

16. The method of claim 14 wherein step (b) is carried out by moving the cutting face concentrically along the exterior length of the head while applying a direct electrical current to the blank and the shaping tool and passing an electrolyte fluid through the chamber to conduct current across the gap between the cutting face and the head until the drive portion and flange portion of the drive head are formed.

17. The method of claim 16 wherein an electrical potential of from about 12 to about 18 volts is applied across the electrolyte fluid.

18. The method of claim 16 wherein the electrolyte fluid comprises an electrolyte salt selected from the group consisting of sodium chloride, sodium bromide, sodium iodide, sodium chlorate, sodium perchlorate, sodium sulfate, sodium nitrate, and mixtures thereof, dissolved in water at a concentration of from about 0.5 to about 3 lb./gallon (from about 60 to about 360 g./l.).

19. The method of claim 16 wherein the cutting face is advanced along the exterior length of the head at a rate in the range of from about 0.01 to about 0.4 in./min (from about 0.2 to about 10.2 mm./min.).

20. The method of claim 19 wherein the rate of advance is in the range of from 0.04 to about 0.2 in./min (from about 1 to about 5.1 mm./min.).

* * * * *

UNITED STATES PATENT AND TRADEMARK OFFICE
CERTIFICATE OF CORRECTION

PATENT NO. : 6,866,769 B2
DATED : March 15, 2005
INVENTOR(S) : Anderson et al.

It is certified that error appears in the above-identified patent and that said Letters Patent is hereby corrected as shown below:

Column 7,
Line 67, the text "V-shaved" should be corrected to -- V-shaped --.

Column 8,
Line 21, the text "culling" should be corrected to -- cutting --.

Signed and Sealed this

Twenty-fourth Day of May, 2005

JON W. DUDAS
*Director of the United States Patent and Trademark Office*